UNITED STATES PATENT OFFICE.

DRAKE W. DENTON, OF ITHACA, NEW YORK.

IMPROVEMENT IN THE MANUFACTURE OF COFFINS AND OTHER ARTICLES FROM ASPHALTIC COMPOSITIONS.

Specification forming part of Letters Patent No. 41,284, dated January 19, 1864.

*To all whom it may concern:*

Be it known that I, DRAKE W. DENTON, of the town of Ithaca, in the county of Tompkins and State of New York, have invented an Improved Material or Composition for the Construction of Coffins, Coffin-Cases, and other Articles; and I do hereby declare that the following is a full and exact description thereof.

The object primarily sought was to make a coffin or burial case out of an indestructible or incorruptible substance. This I make in three forms: first, a simple thin light coffin or burial case that answers in the place of wood; second, a thicker and more durable form, calculated to last indefinitely; third, an airtight coffin or burial case, made so by closing the joinings of the cover by a little of my material or composition poured in the joinings in a melted state or by drawing a heated soldering or other convenient hot iron over the cracks or joinings.

I make my material or composition as follows: I take the pitch of coal-tar, or the dried residue of coal-tar, and modify it by plaster. My mode of doing it is that by any convenient process I deprive coal-tar of its essential oil or volatile product; or I take the pitch of coal-tar which has been made by any process and melt or heat it; and when the pitch of coal-tar or coal-tar residue is at the point of assuming a bituminous hardness at ordinary temperatures, while still hot or heated in any convenient vessel, I add dry common ground commercial plaster or plaster-of-paris, for the purpose of giving a body or consistency to it. It is desirable that the plaster be heat or kiln dried beforehand, so as to deprive it of all dampness. By thus adding plaster I secure an even, consistent material, not liable to settle unevenly, and suited to my uses of it. In some instances I find it desirable to give a further hardness to my material, as well as an additional toughness. This I accomplish by adding to it sand. In other instances I find it desirable to soften my composition or material, made as described, and for this purpose I add to it india-rubber. The hardened form of my material, by the subsequent addition of sand, is useful, for example, in certain forms of my coffin; and the softer form, with india-rubber subsequently added, is useful, for example, in making patterns for brass and iron castings and other articles that need the use of tools and a finished surface after being worked; but I at present contemplate to use my material mainly by molding.

The mold I find desirable to use is made of sheet-steel or other sheet metal that by the inherent elasticity in it cleaves off of the molded article from the edge of the sheet metal when the molded article has cooled—that is, I make the mold of any suitable sheet metal, and I name sheet-steel as the best. I make the mold in such sections or parts as to cleave off of the article made. When cold I disengage one end, corner, edge, or part of the mold, and as I apply force the elasticity of the sheet-steel enables me to cleave or flake or part the mold off of the coffin or article made, otherwise it would stick most adherently to the mold.

As the finish of most articles is best when they have highly-polished surfaces, I use polished sheet-steel for my molds, which leaves the glossy surface desired when they come out of the mold.

I am aware that various compositions of asphalt, coal-tar, plaster, rubber, and other articles have been used. These I do not use nor claim.

Having described my invention so as to enable those skilled in the art to which it appertains to make, mold, and use the same, what I claim is—

1. The use of the material or composition, made as described, in the manufacture of coffins and burial cases and air-tight coffins.

2. The herein-described mode of making my material for coffins and other useful articles from the several materials mentioned.

3. The herein-described mode of molding coffins and other articles by means of plates or patterns or molds made of sheet-steel or other metal that by its elasticity cleaves off of the coffin or other article made in the manner described, and the securing of a polished glossy finish to the coffin or other article without hand polishing or finishing, by means of polished elastic plates, as described.

Ithaca, New York, August 7, 1863.

DRAKE W. DENTON.

Witnesses:
 SAMUEL J. BARKER,
 E. G. PELTON.